United States Patent
Ikeda (10) Patent No.: US 11,642,770 B2
(45) Date of Patent: May 9, 2023

(54) TOOL SYSTEM

(71) Applicant: PANASONIC INTELLECTUAL PROPERTY MANAGEMENT CO., LTD., Osaka (JP)

(72) Inventor: Masaki Ikeda, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 768 days.

(21) Appl. No.: 16/560,758

(22) Filed: Sep. 4, 2019

(65) Prior Publication Data

US 2020/0078920 A1 Mar. 12, 2020

(30) Foreign Application Priority Data

Sep. 6, 2018 (JP) .............................. JP2018-167378

(51) Int. Cl.
*B25F 3/00* (2006.01)
*B25F 5/02* (2006.01)
*B25F 5/00* (2006.01)
*B23D 45/16* (2006.01)

(52) U.S. Cl.
CPC ................ *B25F 3/00* (2013.01); *B25F 5/001* (2013.01); *B25F 5/02* (2013.01); *B23D 45/16* (2013.01); *B25F 5/00* (2013.01)

(58) Field of Classification Search
CPC . B23D 45/16; B25F 3/00; G05B 2219/49302; G05B 2219/49303; G05B 2219/49304; G05B 2219/25294
See application file for complete search history.

(56) References Cited

U.S. PATENT DOCUMENTS

| 4,540,318 | A | * | 9/1985 | Hornung | B25F 5/001 408/8 |
| 6,360,136 | B1 | * | 3/2002 | Lamers | G05B 19/12 483/8 |
| 7,489,856 | B2 | * | 2/2009 | Haller | B23Q 17/09 388/828 |
| 10,562,168 | B2 | * | 2/2020 | Lutz | B24B 23/028 |
| 2006/0087286 | A1 | * | 4/2006 | Phillips | H01M 50/20 320/114 |
| 2006/0234617 | A1 | * | 10/2006 | Francis | B23D 61/025 452/174 |
| 2007/0084613 | A1 | * | 4/2007 | Zhang | B25B 21/00 173/1 |

(Continued)

FOREIGN PATENT DOCUMENTS

| CA | 3 033 914 A1 | 3/2018 |
| DE | 10 2016 214 844 A1 | 2/2018 |

(Continued)

OTHER PUBLICATIONS

Extended European Search Report dated Feb. 4, 2020 issued in corresponding European Patent Application No. 19 193 756.4.

*Primary Examiner* — Joshua G Kotis
(74) *Attorney, Agent, or Firm* — McDermott Will & Emery LLP (57) ABSTRACT

The tool system includes a body, a driver, and a tool sensing unit. To the body, a tool is attachable. The driver is configured to drive the tool attached to the body. The tool sensing unit is configured to perform identification of a type of the tool attached to the body.

6 Claims, 4 Drawing Sheets

(56) References Cited

U.S. PATENT DOCUMENTS

| | | | | |
|---|---|---|---|---|
| 2008/0302549 A1* | 12/2008 | Zeiler | ............... | B23B 51/00 408/239 R |
| 2013/0118767 A1* | 5/2013 | Cannaliato | ............ | B25F 3/00 173/29 |
| 2013/0255980 A1* | 10/2013 | Linehan | ............... | B25F 5/02 173/2 |
| 2016/0375570 A1* | 12/2016 | Boeck | ............ | G05B 19/4062 700/169 |
| 2017/0043471 A1* | 2/2017 | Heszler | ............... | B25F 5/00 |
| 2017/0274489 A1* | 9/2017 | Baratta | ............. | B23D 61/02 |
| 2017/0320183 A1* | 11/2017 | Rola | ............. | B23Q 17/2457 |
| 2019/0294138 A1* | 9/2019 | Dobashi | ............ | B25B 23/14 |
| 2020/0306906 A1* | 10/2020 | Yoshikane | ........ | B23Q 11/0071 |

FOREIGN PATENT DOCUMENTS

| | | |
|---|---|---|
| EP | 1 884 325 A1 | 2/2008 |
| JP | 2009-534203 A | 9/2009 |
| JP | 2014-233793 A | 12/2014 |
| WO | 2006/104929 A2 | 10/2006 |
| WO | 2007/121534 A1 | 11/2007 |

\* cited by examiner

TOOL SYSTEM

CROSS-REFERENCE TO RELATED APPLICATION

The present application is based upon and claims the benefit of priority of Japanese Patent Application No. 2018-167378, filed on Sep. 6, 2018, the entire contents of which are incorporated herein by reference.

TECHNICAL FIELD

The present disclosure generally relates to power tool systems and specifically to a power tool system including a body to which a tool is attachable.

BACKGROUND ART

JP 2009-534203 A discloses a handheld electric power tool. The handheld electric power tool includes an electric motor configured to drive a driven member that grips a working element (e.g., an abrasive disc). For example, a myriad of different discs are used for cutting discs, buffing pads, and saws, each of which can be renewed when worn or switched when required.

In the handheld electric power tool described in Patent Literature 1, however, the type of a disk (tool) in use is difficulty identified. Therefore, work which the disk in use does not support may be done. If work which the disk in use does not support is done, a failure or breakage of the handheld electric power tool, such as damage to the electric motor, may occur.

SUMMARY

In view of the foregoing, it is an object of the present disclosure to provide a tool system in which a failure or breakage is less likely to occur.

A tool system according to an aspect of the present disclosure includes: a body to which a tool is attachable; a driver configured to drive the tool attached to the body; and a tool sensing unit configured to perform identification of a type of the tool attached to the body.

DETAILED DESCRIPTION

First Embodiment (1) Schema

Figure 1:
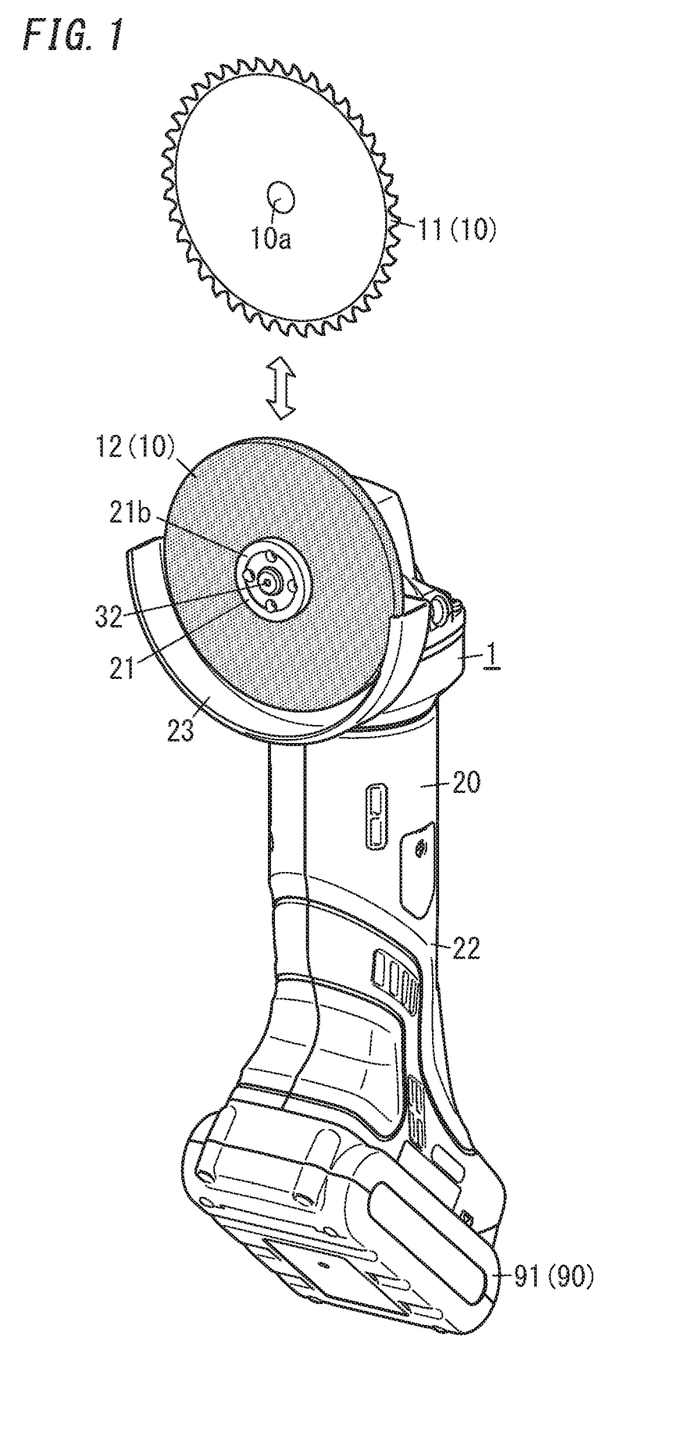
FIG. 1 is a perspective view illustrating a tool system according to a first embodiment.
Figure 2:
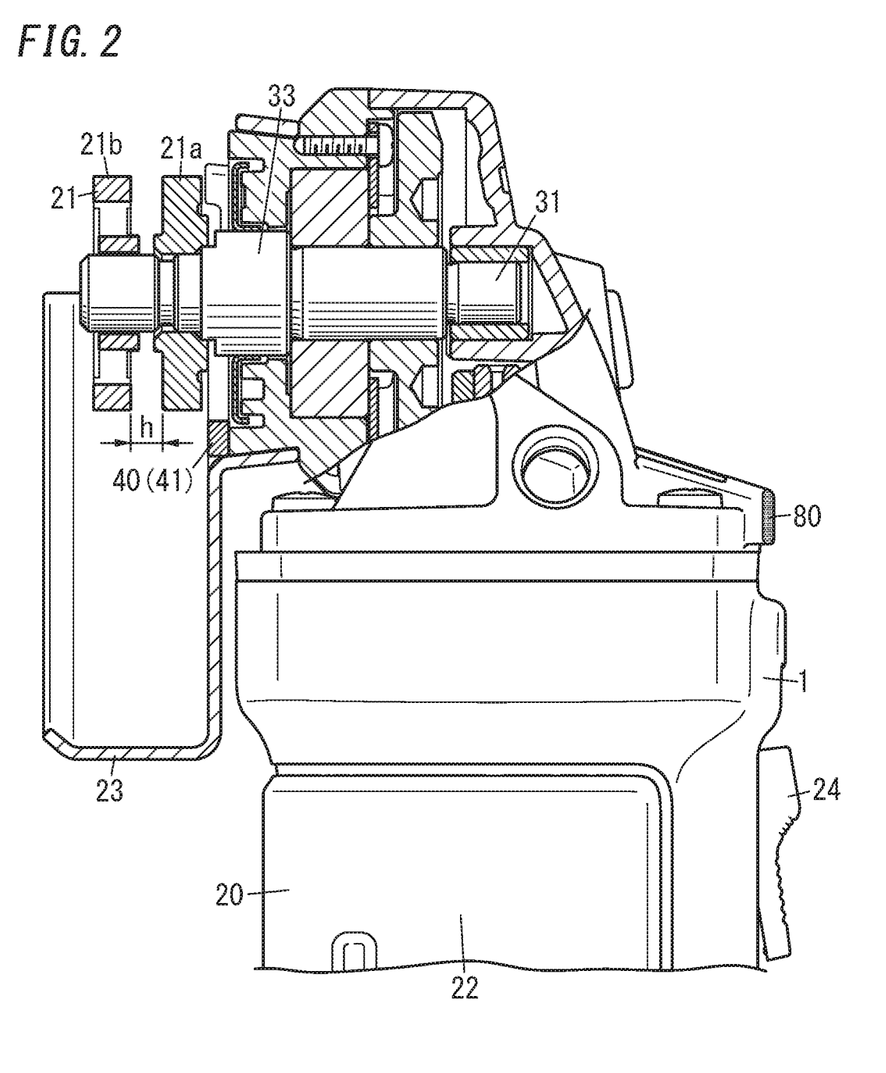
FIG. 2 is a sectional view illustrating part of the tool system.

FIGS. 1 and 2 show a tool system 1 according to the present embodiment. The tool system 1 is an electric power tool system. The tool system 1 includes a body 20, a driver 30, and a tool sensing unit 40.

The body 20 is a grinder. The body 20 is, for example, a portable electric power grinder or a handheld electric power grinder. To the body 20, a tool 10 is attachable. In other words, the tool 10 is separated from the body 20, and the tool 10 is attachable to and detachable from the body 20 as needed. In the present embodiment, examples of the tool 10 include a cutting blade 11 and a grinding blade 12.

The driver 30 has a function of driving the tool 10 attached to the body 20. That is, the driver 30 gives power to the tool 10 attached to the body 20 to rotate or vibrate. In the present embodiment, the driver 30 is, for example, a motor and gives power to the tool 10, thereby rotating the tool 10.

The tool sensing unit 40 has a function of identifying the type of the tool 10 attached to the body 20. That is, the tool sensing unit 40 identifies which type of a plurality of types the tool 10 corresponds to in a state where the tool 10 is attached to the body 20. In the present embodiment, when examples of the types of the tool 10 include the cutting blade 11 and the grinding blade 12, the tool sensing unit 40 is configured to identify the cutting blade 11 and the grinding blade 12. That is, the tool sensing unit 40 is configured to distinguish a plurality of types of tools 10 for different functions or usages.

The tool system 1 according to the present embodiment is configured to identify, with the tool sensing unit 40, the type of the tool 10 attached to the body 20. That is, the tool system 1 is configured to determine, before or during its use, which work the tool 10 attached to the body 20 supports. Thus, a worker using the tool system 1 easily recognizes the type of the tool 10 attached to the body 20 and is less likely to do work unsupported by the tool 10. This provides the advantage that a failure or breakage of the driver 30 caused due to incorrect use of the tool 10 is less likely to occur. This also provides the advantage that a failure or breakage of the tool 10 caused due to incorrect use of the tool 10 is less likely to occur.

(2) Details

The tool system 1 according to the present embodiment will be described in detail below.

(2.1) Configuration

Figure 3:
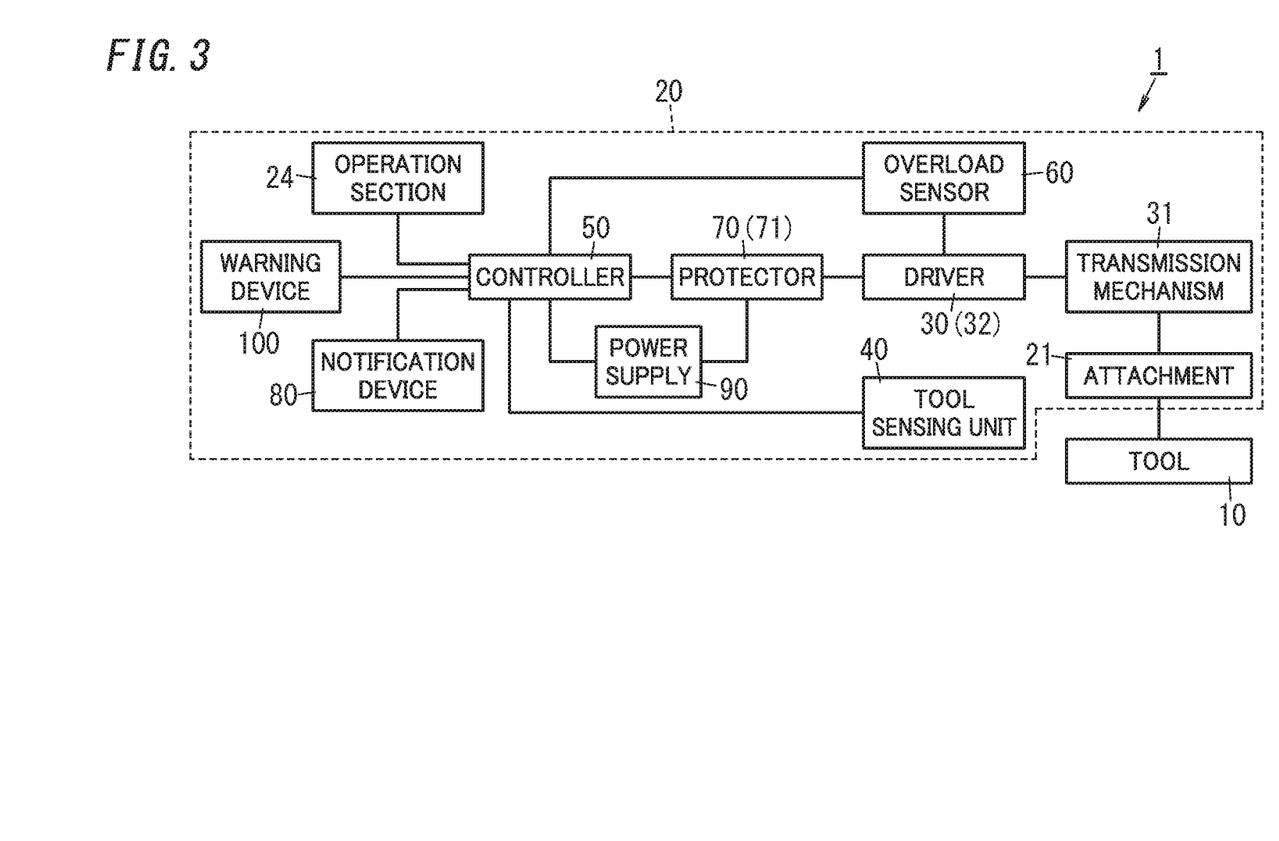
FIG. 3 is a block diagram schematically illustrating a configuration of the tool system.

As illustrated in FIGS. 1, 2, and 3, the tool system 1 includes the body 20, the driver 30, and the tool sensing unit 40. In the present embodiment, the tool system 1 may further include the tool 10. That is, the tool 10 is a component of the tool system 1. Note that the tool 10 does not necessarily have to be a component of the tool system 1. That is, the tool system 1 does not have to include the tool 10.

The body 20 includes a housing 22. The housing 22 includes the tool sensing unit 40 and the driver 30. That is, the housing 22 accommodates the tool sensing unit 40 and the driver 30. The housing 22 accommodates a controller 50, an overload sensor 60, a protector 70, a notification device 80, and a warning device 100.

As illustrated in FIG. 1, the housing 22 is a tubular housing having such a thickness that the tubular housing can be grabbed with a single hand. The housing 22 has one end (rear end) to which a battery pack 91 as a power supply 90 is attached. The battery pack 91 is detachably attached to the housing 22. The housing 22 has the other end (front end) whose lower surface is provided with a cover 23. The cover 23 has a semicircular arc shape in bottom plan view, and the cover 23 protrudes rearward from the front end of the housing 22.

As illustrated in FIG. 2, the housing 22 has an upper surface provided with a manipulation section 24. The manipulation section 24 is configured to receive an operation given by a user to turn ON and OFF a switch. The manipulation section 24 is manipulated to turn ON the switch, thereby allowing electric power to be supplied from the power supply 90 to the driver 30 so as to operate the driver 30. The manipulation section 24 is manipulated to turn OFF the switch, thereby stopping supply of the electric power from the power supply 90 to the driver 30 so as to stop the operation of the driver 30.

The upper surface of the housing 22 is provided with the notification device 80. The notification device 80 is configured to perform notification of an identification result by the tool sensing unit 40. That is, the notification device 80 is configured to perform notification of the type of the tool 10 identified by the tool sensing unit 40. The notification device 80 includes, for example, a light-emitting element such as a light-emitting diode (LED). In this case, it is possible to cause the light-emitting element to emit light, extinguish light, change the color of emitting light, flash light, or change the flashing interval of light depending on the type of the tool 10 identified by the tool sensing unit 40. Alternatively, the notification device 80 may be a liquid crystal display. In this case, the type of the tool 10 identified by the tool sensing unit 40 is displayable as characters or symbols. Alternatively, the notification device 80 may be configured to output a sound. In this case, depending on the type of the tool 10 identified by the tool sensing unit 40, the scale, volume, timbre, or the like of the sound is changeable with the notification device 80. Alternatively, the notification device 80 may be configured to transmit a signal to an external apparatus. In this case, it is possible, depending on the type of the tool 10 identified by the tool sensing unit 40, to change the interval or timing of transmitting the signal from the notification device 80. Thus, the notification device 80 is configured to notify a user or the like of the type of the tool 10 attached to the body 20.

The driver 30 has a function of driving the tool 10 attached to the body 20. That is, the driver 30 gives power to the tool 10 attached to the body 20 to rotate. In the present embodiment, the driver 30 is a motor 32. As illustrated in FIG. 3, a transmission mechanism 31 is mechanically connected to the driver 30. That is, the motor 32 serving as the driver 30 has a rotary shaft to which the transmission mechanism 31 is mechanically connected. The transmission mechanism 31 has a function of transmitting rotary driving force of the rotary shaft of the motor 32 to the tool 10. The transmission mechanism 31 includes a gear, a bevel gear, an output shaft 33, and the like.

The body 20 includes an attachment 21 to which the tool 10 is to be attached. In the present embodiment, the attachment 21 is provided at an end of the output shaft 33. The attachment 21 includes a pair of ring members 21a and 21b provided at the end of the output shaft 33. In this case, the tool 10 is attached to the output shaft 33 with the tool 10 being sandwiched in a thickness direction between the pair of ring members 21a and 21b. That is, in a state where one ring member 21a is attached to the output shaft 33, a tip of the output shaft 33 is inserted into a pore 10a formed in the tool 10, and then, the other ring member 21b is attached to the output shaft 33.

The tool sensing unit 40 has a function of identifying the type of the tool 10 attached to the body 20. That is, the tool sensing unit 40 has a function of performing checking to know the type of the tool 10 in a state where the tool 10 is attached to the output shaft 33. That is, the tool sensing unit 40 is configured to identify a plurality of types of tools 10 for different functions or usages. In the present embodiment, examples of the types of the tool 10 include the cutting blade 11 and the grinding blade 12. The cutting blade 11 has a round thin plate shape (thin disc). The cutting blade 11 has a side surface provided with a blade and is configured to perform cutting with the side surface. The grinding blade 12 has a round thin plate shape thicker than the cutting blade 11. The grinding blade 12 has a surface having fine recesses and protrusions and is configured to perform grinding (e.g., deburring) with the surface. In the present embodiment, either the cutting blade 11 or the grinding blade 12 is attached to the output shaft 33 in use. That is, any one of the plurality of tools 10 different in type is attached to the body 20.

The tool sensing unit 40 may have any configuration as long as the tool sensing unit 40 can identify the type of the tool 10. For example, when the plurality of types of tools 10 have respective thicknesses, the tool sensing unit 40 can identify the type of the tool 10 attached to the body 20 based on the difference in thickness of the tools 10. When the tool sensing unit 40 is configured to identify the type of the tool 10 based on the difference in thickness of the tools 10, the tool sensing unit 40 can identify the dimension h of the attachment 21 in a state where the tool 10 is attached to the body 20. In the present disclosure, "the dimension h of the attachment 21" is a dimension of the attachment 21, the dimension being changed by attaching the tool 10 to the attachment 21, the dimension reflecting the dimension of the tool 10 attached to the attachment 21. That is, since the tool 10 attached to the output shaft 33 is sandwiched between the pair of ring members 21a and 21b, the distance between the pair of ring members 21a and 21b (equivalent to the dimension h) is substantially equal to the thickness of the tool 10 attached to the output shaft 33. Thus, the distance between the pair of ring members 21a and 21b varies for each of the plurality of types of tools 10 having different thicknesses. Thus, measuring the distance between the pair of ring members 21a and 21b with the tool sensing unit 40 enables the type of the tool 10 to be identified.

The tool sensing unit 40 includes an optical sensor 41 which performs identification. That is, the tool sensing unit 40 includes the optical sensor 41 configured to identify the type of the tool 10. Examples of the optical sensor 41 include a passive sensor configured to obtain the shape of an object as image data. Alternatively, the optical sensor 41 may be a laser sensor or an LED sensor. When the tool sensing unit 40 measures the dimension h of the attachment 21, the optical sensor 41 may use, as an optical sensor 41, an imaging element configured to capture an image of the attachment 21. That is, an image of the attachment 21 is captured with the optical sensor 41 to obtain image data, and based on the image data, the dimension h can be measured. The optical sensor 41 may be disposed at any location as long as the optical sensor 41 can obtain the image data of the attachment 21. For example, the optical sensor 41 may be disposed on an inner surface of the cover 23. Note that since the cutting blade 11 performs cutting with its side surface, the cutting blade 11 generally has a thickness smaller than that of the grinding blade 12. Thus, the tool sensing unit 40 having a simple structure can be incorporated, and therefore, cost can be reduced.

The tool system 1 includes a controller 50 configured to, when an overload applied to the driver 30 is sensed, control the driver 30 by a control method which varies in accordance with an identification result by the tool sensing unit 40. In other words, when the overload applied to the driver 30 is sensed, the controller 50 changes the control method of the driver 30 in accordance with the type of the tool 10 attached to the body 20. In the present embodiment, the overload sensor 60 is provided, which is configured to sense the overload applied to the driver 30. That is, the overload sensor 60 senses the overload applied to the driver 30. When the driver 30 is the motor 32, the overload sensor 60 may include a torque sensor to sense the overload applied to the driver 30. Alternatively, an overcurrent flowing through the motor 32 may be sensed as the overload. In this case, the overload sensor 60 may include an overcurrent sensor. Alternatively, a temperature of the motor 32 may be sensed as the overload. In this case, the overload sensor 60 may include a temperature sensor. Since an allowable overload varies depending on the type of the tool 10 attached to the body 20, the overload sensor 60 sets, depending on the type of the tool 10, the magnitude of the overload to be sensed, where the type is known from the identification result by the tool sensing unit 40.

The controller 50 includes, for example, a microcomputer including a central processing unit (CPU) and memory, and the CPU executes a program stored in the memory to control operation of the motor 32. In a case where when the overload applied to the driver 30 is sensed, the driver 30 is controlled by a different control method, operation of the motor 32 may be stopped, or the rotation speed of the rotary shaft may be reduced, so as to perform control different from that in a normally used state.

In the present embodiment, the protector 70 is provided, which is configured to protect the driver 30 when the tool sensing unit 40 identifies a particular tool 10 and the overload sensor 60 senses an overload. In other words, when the overload is sensed by the overload sensor 60, the protector 70 protects the driver 30 in accordance with the type of the particular tool 10, the type being identified by the tool sensing unit 40. In the present disclosure, "overload" means a state where a load larger than an allowable load is applied to the driver 30. For example, in the case of the driver 30 being the motor 32, the overload is caused, for example, when large rotation torque is caused at the tool 10 and a locked state of the rotary shaft of the motor 32 continues, or when the motor 32 is driven with a low current continuously for a long period of time. For example, when the particular tool 10 is the grinding blade 12, the tool sensing unit 40 identifies that the type of the tool 10 is the grinding blade 12, and when an overload applied to the driver 30 is sensed, the protector 70 protects the driver 30. A case where use of the grinding blade 12 applies the overload to the driver 30 is, for example, a case where a workpiece is attempted to be cut with the grinding blade 12. Since the grinding blade 12 is thicker than the cutting blade 11, pressing a side surface of the grinding blade 12 against a surface of a workpiece in an attempt to cut the workpiece may cause a larger rotation torque than in a case where the grinding blade 12 is used for grinding. The large rotation torque is applied via the transmission mechanism 31 to the rotary shaft of the motor 32, thereby applying the overload to the motor 32. In the present disclosure, "protect" means preventing continuation of an overloaded state of the driver 30. For example, when the driver 30 is the motor 32, the protector 70 may interrupt supply of electric power to the motor 32 or may reduce the electric power supplied to the motor 32 so as to protect the motor 32 from the overload.

The protector 70 may include a grinding blade protector 71. When the tool 10 attached to the body 20 is the grinding blade 12, the grinding blade protector 71 protects, in particular, the driver 30 from the overload. That is, in a case where the type of the particular tool 10 identified by the tool sensing unit 40 is the grinding blade 12, the grinding blade protector 71 protects the driver 30 from an overload caused due to use of the grinding blade 12 when the overload is sensed by the overload sensor 60. The grinding blade 12 is likely to be incorrectly used as compared to the cutting blade 11, which is likely to apply the overload to the driver 30. That is, if a workpiece is attempted to be cut with the grinding blade 12, large rotation torque may be caused at the driver 30. Thus, in particular, when the grinding blade 12 is used, the grinding blade protector 71 may be provided to reduce the overload applied to the driver 30.

The warning device 100 has a function of outputting a warning when the overload sensor 60 senses the overload applied to the driver 30. The warning device 100 may be, for example, a loudspeaker configured to output the warning as a sound. Alternatively, the warning device 100 may be, for example, a display configured to output the warning as characters or light. It is possible to notify a user of the overload applied to the driver 30 by the warning output by the warning device 100.

(2.2) Operation

Figure 4:
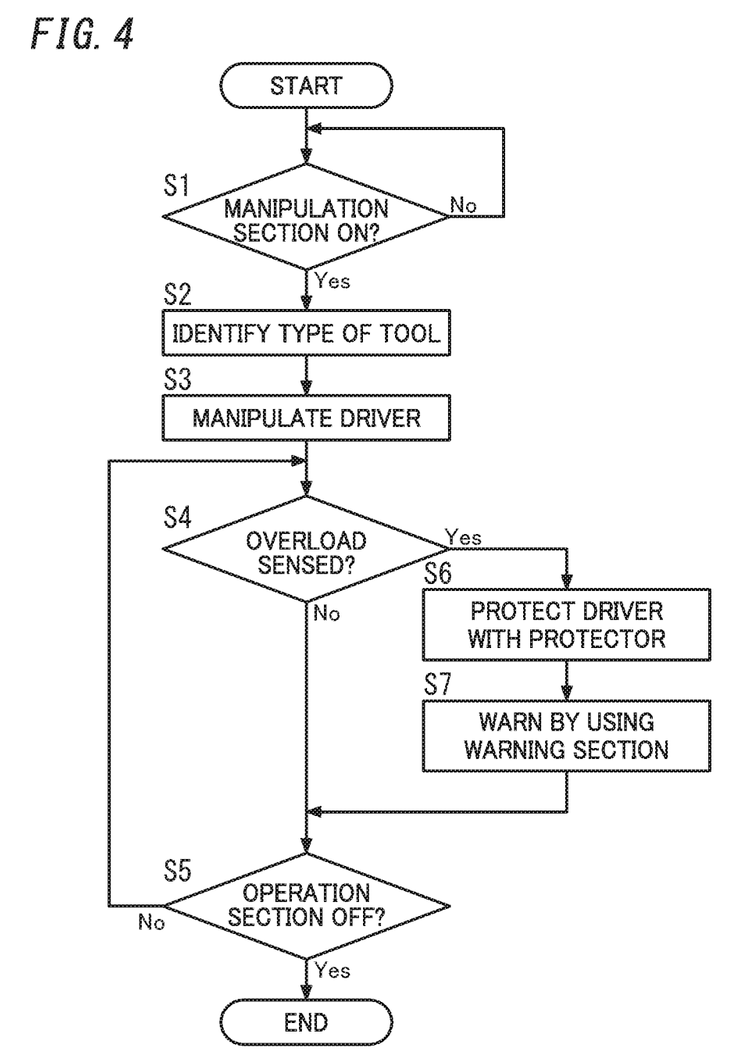
FIG. 4 is a flowchart illustrating operation of the tool system.

Operation of the tool system 1 according to the present embodiment will be described with reference to FIGS. 3 and 4. First, the tool 10 is attached to the attachment 21. The type of the tool 10 is selected in accordance with work to be done by a user of the tool system 1. Next, the manipulation section 24 is manipulated to turn ON the switch (step S1). Thus, the power supply 90 supplies electric power to the controller 50. Then, the tool sensing unit 40 performs identification of the type of the tool 10 attached to the attachment 21 (step S2). A result of the identification is input and stored in the controller 50. Moreover, the controller 50 controls the notification device 80 so as to perform a display according to the type of the tool 10.

Then, the power supply 90 supplies electric power via the protector 70 to the driver 30. Thus, the driver 30 operates (step S3). Moreover, driving force generated by the driver 30 is transmitted via the transmission mechanism 31 and the attachment 21 to the tool 10, so that the tool 10 is driven to rotate by rotation of the output shaft 33. Driving the tool 10 in this way to rotate enables work intended by a user to be done. For example, when the tool 10 is the cutting blade 11, it is possible to do cutting work of a workpiece. When the tool 10 is the grinding blade 12, it is possible to do grinding work such as deburring of a surface of a workpiece. Then, if the overload sensor 60 senses no overload caused at the driver 30 (step S4), the manipulation section 24 is manipulated at the end of the work to turn OFF the switch (step S5). In this way, supply of electric power from the power supply 90 to the controller 50 and the driver 30 is stopped.

On the other hand, if during the work, the overload sensor 60 senses the overload caused at the driver 30 (step S4), the protector 70 protects the driver 30 (step S6). Moreover, the warning device 100 outputs a warning (step S7). Then, protection of the driver 30 by the protector 70 and the warning from the warning device 100 continue until the manipulation section 24 is manipulated to turn OFF the switch (step S5).

In the present embodiment, when the overload applied to the driver 30 is sensed, the controller 50 controls the driver 30 by a control method according to the identification result by the tool sensing unit 40. That is, the tool sensing unit 40 performs identification of the type of the tool 10 attached to the body 20, and a result of the identification is input to the controller 50. When the overload is not sensed, the controller 50 determines that the tool 10 is in the normal usage state. When it is determined that the tool 10 is in the normal usage state, the controller 50 executes a normal control method corresponding to the type of the tool 10 to control the driver 30.

For example, when the tool 10 is identified as the cutting blade 11, and a workpiece cuttable by the cutting blade 11 is cut, the overload is less likely to be sensed. Thus, the controller 50 controls the motor 32 such that the motor 32 operates, for example, at a rotation speed corresponding to cutting work by the cutting blade 11.

Moreover, for example, when the tool 10 is identified as the grinding blade 12, and a workpiece grindable by the grinding blade 12 is ground, the overload is less likely to be sensed. Thus, the controller 50 controls the motor 32 such that the motor 32 operates, for example, at a rotation speed corresponding to grinding work by the grinding blade 12.

On the other hand, when the overload sensor 60 senses the overload applied to the driver 30, it is determined that the tool 10 is incorrectly used and is not in the normal usage state. When it is determined that the tool 10 is not in the normal usage state, the controller 50 controls the drier 30 by a control method different from that in the normal usage state. The control method which is different is a control method corresponding to an associated one of the types of tools 10.

For example, when the tool 10 is identified as the cutting blade 11, and a workpiece uneasily cuttable by the cutting blade 11 is cut, an overload, such as flowing of an overcurrent, may be sensed. In this case, the controller 50 reduces or stops the electric power supplied to the motor 32 so as to control the motor 32 by a control method different from that in a normal state. That is, the controller 50 controls the motor 32 by causing the motor 32 to operate, for example, at a rotation speed at which the overload of the motor 32 is reduced, stopping operation of the motor 32.

Moreover, for example, when the tool 10 is identified as the grinding blade 12, and a workpiece uneasily grindable by the grinding blade 12 is ground, an overload, such as flowing of an overcurrent, may be sensed. Alternatively, when a workpiece is attempted to be cut with the side surface of the grinding blade 12, an overload, such as flowing of an overcurrent, may be sensed. In such a case, the controller 50 reduces or stops the electric power supplied to the motor 32 so as to control the motor 32 by a control method different from that in a normal state. That is, the controller 50 controls the motor 32 such that the motor 32 operates, for example, at a rotation speed for reducing the overload applied to the motor 32, or operation of the motor 32 stops.

As described above, in the present embodiment, when the overload applied to the driver 30 is sensed, the controller 50 controls the driver 30 by a control method (i.e., control method corresponding to the type of the tool 10) according to the identification result by the tool sensing unit 40. Thus, it is possible to sense the overload applied to the driver 30 corresponding to an associated one of the plurality of types of tools 10. When the overload of the driver 30 is sensed, the driver 30 is controlled by a control method which corresponds to an associated one of the plurality of types of tools 10 and which is different from that in a normal state. This enables breakage or failures of the body 20 and the tool 10 caused due to the overload applied to the driver 30 to be reduced.

In the present embodiment, for example, when the tool 10 is identified as the cutting blade 11, an overload sensed by the overload sensor 60 highly possibly means that the side surface of the cutting blade 11 is too strongly pressed against a workpiece. In this case, the warning device 100 may be configured to output a warning as a sound or display. Thus, operation of the driver 30 is not stopped, but simply warning suffices to reduce pressing force of the cutting blade 11, and therefore, work efficiency is not unnecessarily reduced.

In particular, when the tool 10 is identified as the grinding blade 12, there is a good chance of cutting attempted by using the side surface of the grinding blade 12. Therefore, before the side surface of the grinding blade 12 is broken (severely damaged), control, such as stopping operation of the driver 30, is possible. In this case, it is possible to reduce breakage of the side surface of the grinding blade 12 caused when the side surface of the grinding blade 12 is pressed against a workpiece. Moreover, it is possible to make a notification with the notification device 80 to prompt a user to replace the grinding blade 12 with the cutting blade 11.

Moreover, when cutting is forcibly performed with the side surface of the grinding blade 12, an overload is applied to the motor 32, and the temperature of the motor 32 may increase to an abnormal temperature. This may seize the motor 32 and may lead to a failure of an electronic component mounted on a substrate in the vicinity of the motor 32. In the present embodiment, the controller 50 is provided to control, when the overload applied to the motor 32 is sensed, the motor 32 in accordance with the type of the tool 10. Thus, it is possible to reduce the overload applied to the motor 32, and it is possible to reduce seizure of the motor 32 and a failure and breakage of an electronic component mounted on a substrate in the vicinity of the motor 32.

(3) Variation

The first embodiment is a mere example of various embodiments of the present disclosure. Various modifications may be made to the first embodiment depending on design and the like as long as the object of the present disclosure is achieved.

The electric power tool system including the motor 32 used as the driver 30 has been described above, but this should not be construed as limiting. For example, the driver 30 which receives fluid pressure or air pressure as power may be adopted.

An example in which the optical sensor 41 is used to measure the dimension h of the attachment 21 has been described above, but this should not be construed as limiting. For example, the tool sensing unit 40 can measure the dimension h of the attachment 21 with various types of displacement sensors. As the displacement sensors, various sensors such as an ultrasonic sensor, a contact sensor, an Eddy-current sensor, and a proximity sensor may be used.

Moreover, the tool sensing unit 40 may identify the type of the tool 10 by radio frequency identification (RFID) based on a radio frequency tag (RF tag). In this case, an RF tag is attached to the tool 10. Alternatively, the tool sensing unit 40 may identify the type of the tool 10 based on a two-dimensional code such as a QR code (registered trademark) or a barcode. In this case, the two-dimensional code or barcode is provided to the tool 10.

Moreover, the body 20 including the controller 50 has been described above, but this should not be construed as limiting. For example, the controller 50 may be included in an external apparatus other than the body 20. The external apparatus is, for example, a personal computer, a server, or a portable terminal. Moreover, in this case, the body 20 and the external apparatus have communication functions for communication with each other. Moreover, the external apparatus may include, in addition to the controller 50, at least one of a component selected from a group consisting of the notification device 80, the overload sensor 60, and the warning device 100.

SUMMARY

As described above, a tool system (1) of a first aspect includes a body (20), a driver (30), and a tool sensing unit (40). To the body (20), a tool (10) is attachable. The driver (30) is configured to drive the tool (10) attached to the body (20). The tool sensing unit (40) is configured to perform identification of a type of the tool (10) attached to the body (20).

This aspect provides the advantage that the tool sensing unit (40) can identify the type of the tool (10), work unsupported by the tool (10) currently used is less likely to be done, and a failure or breakage is less likely to occur.

A tool system (1) of a second aspect referring to the first aspect further includes a controller (50) configured to control, based on sensing of an overload applied to the driver (30), the driver (30) by a control mode (control method) according to a result of the identification performed by the tool sensing unit (40).

This aspect provides the advantage that when the overload applied to the driver (30) is sensed, control by a control method corresponding to the type of the tool (10) identified by the tool sensing unit (40) is possible, and a failure or breakage of the driver (30) is less likely to be caused.

A tool system (1) of a third aspect referring to the first or second aspect further includes an overload sensor (60) configured to sense an overload applied to the driver (30) based on a result of the identification performed by the tool sensing unit (40).

This aspect provides the advantage that the overload sensor (60) can sense an overload according to the type of the tool (10) identified by the tool sensing unit (40), and thus, it is easy to react to the overload according to the type of the tool (10).

A tool system (1) of a fourth aspect referring to the third aspect further includes a protector (70) configured to protect the driver (30) when the tool sensing unit (40) identifies the type of the tool (10) as a particular type and the overload sensor (60) senses the overload.

This aspect provides the advantage that the protector (70) can protect the driver (30) from the overload according to the type of the tool (10) identified by the tool sensing unit (40), and protection corresponding to the overload according to the type of the tool (10) is easily performed.

A tool system (1) of a fifth aspect referring to any one of the first to fourth aspects further includes a notification device (80) configured to perform notification of a result of the identification performed by the tool sensing unit (40).

This aspect provides the advantage that the type of the tool (10) is easily identified based on the notification by the notification device (80) and work corresponding to the type of the tool (10) is easily done.

In a tool system (1) of a sixth aspect referring to any one of the first to fifth aspects, the body (20) includes an attachment (21) to which the tool (10) is attachable. The tool sensing unit (40) is configured to perform the identification of the type of the tool (10) based on a dimension of the attachment (21) in a state where the tool (10) is attached to the attachment (21).

This aspect provides the advantage that sensing the dimension of the attachment (21) with the tool sensing unit (40) enables the type of the tool (10) to be identified, and attaching the tool (10) to the attachment (21) enables the type of the tool (10) to be identified.

In a tool system (1) of a seventh aspect referring to any one of the first to sixth aspects, the tool sensing unit (40) includes an optical sensor (41) which performs identification of the type of the tool (10).

This aspect provides the advantage that the type of the tool (10) is identifiable by the optical sensor (41), and attaching the tool (10) to the body (20) enables the type of the tool (10) to be identified.

In a tool system (1) of an eighth aspect referring to any one of the first to seventh aspects, the body (20) is a grinder. The tool sensing unit (40) is configured to at least determine whether the tool (10) is a cutting blade (11) having a side surface for cutting or a grinding blade (12) having a surface for grinding.

This aspect provides the advantage that it is possible to determine, with the tool sensing unit (40), whether the tool (10) is the cutting blade (11) or the grinding blade (12), and work unsupported by the cutting blade (11) or work unsupported by the grinding blade (12) is less likely to be done, so that a failure or breakage is less likely to occur.

In a tool system (1) of a ninth aspect referring to the eighth aspect, the tool (10) is the grinding blade (12). The tool system further includes a grinding blade protector (71) configured to protect the driver (30) when an overload applied to the driver (30) is sensed.

This aspect provides the advantage that when work unsupported by the grinding blade (12) is done, the driver (30) can be protected by the grinding blade protector (71), and a failure or breakage of the driver (30) is less likely to occur.

A tool system (1) of a tenth aspect referring to any one of the first to ninth aspects further includes a housing (22) which accommodates the tool sensing unit (40) and the driver (30).

This aspect provides the advantage that the tool sensing unit (40) identifies the type of the tool (10), thereby reducing the occurrence of a failure or breakage of the driver (30) accommodated in the housing (22), and thus a failure or breakage of the body (20) is less likely to occur.

A tool system (1) of an eleventh aspect referring to any one of the first to tenth aspects further includes a tool (10).

This aspect provides the advantage that the tool sensing unit (40) is configured to identify the type of the tool (10), work unsupported by the tool (10) currently used is less likely to be done, and a failure or breakage of the tool (10) is less likely to occur.

The invention claimed is:

1. A handheld tool system, comprising:
    a body comprising an attachment, wherein the attachment comprises a pair of ring members configured to accommodate a tool within a distance between the ring members to attach the tool to the body;
    a driver configured to drive the tool attached to the body;
    a tool sensing unit configured to perform identification of a type of the tool attached to the body, wherein the type of the tool is identified from a plurality of types of tools for carrying out different functions including a cutting blade and a grinding blade, wherein the tool sensing unit is configured to measure the distance between the ring members corresponding to a thickness of the tool attached to the body and identify the type of the tool based on the thickness,
    an overload sensor configured to adjust an overload value based on the identified type of the tool;
    a grinding blade protector configured to protect the driver when the tool sensing unit finds that the tool is the grinding blade and the overload sensor senses the overload value applied to the driver.

2. The tool system of claim 1, further comprising a controller configured to control, based on sensing of an overload applied to the driver, the driver by a control mode according to a result of the identification performed by the tool sensing unit.

3. The tool system of claim 1, further comprising a notification device configured to perform notification of a result of the identification performed by the tool sensing unit.

4. The tool system of claim 1, wherein the tool sensing unit includes an optical sensor which performs identification of the type of the tool.

5. The tool system of claim 1, wherein the body includes a housing which accommodates the tool sensing unit and the driver.

6. The tool system of claim 1, further comprising the tool.

\* \* \* \* \*